United States Patent [19]

Doty et al.

[11] Patent Number: 4,989,707

[45] Date of Patent: Feb. 5, 1991

[54] RESETTABLE SHAFT CLUTCH-DISCONNECT FOR A CO-AXIAL DRIVE SHAFT

[75] Inventors: James H. Doty, Roscoe; William F. Smith, Rockford, both of Ill.

[73] Assignee: Sundstrand Corporation, Rockford, Ill.

[21] Appl. No.: 416,832

[22] Filed: Oct. 3, 1989

[51] Int. Cl.⁵ .............................................. F16D 11/00
[52] U.S. Cl. ..................................... 192/67 R; 192/94; 74/15.66
[58] Field of Search ............. 192/67 R, 24, 25, 114 T, 192/94; 74/15.66

[56] References Cited

U.S. PATENT DOCUMENTS

| | | | |
|---|---|---|---|
| 2,642,970 | 6/1953 | Szekely | 192/67 R |
| 3,217,847 | 11/1965 | Petrak | 192/67 R |
| 3,265,174 | 8/1966 | Polzin | 192/67 R |
| 3,713,518 | 1/1973 | Hawkins | 192/46 |
| 4,042,088 | 8/1977 | Schmohe | 192/89 A |
| 4,192,411 | 3/1980 | Fogelberg | 192/67 R |
| 4,300,667 | 11/1981 | Fogelberg | 192/67 R |
| 4,327,821 | 5/1982 | Telford | 192/67 R |
| 4,393,965 | 7/1983 | Zouzoulas | 192/48.91 |
| 4,562,908 | 1/1986 | Zouzoulas | 192/48.91 |
| 4,684,000 | 8/1987 | Brown | 192/67 R |
| 4,768,634 | 9/1988 | Quick et al. | 192/67 R |

FOREIGN PATENT DOCUMENTS 867931 7/1949 Fed. Rep. of Germany .... 192/67 R
142149 11/1980 Japan ................................ 192/67 R Primary Examiner—Rodney H. Bonck
Assistant Examiner—Andrea Pitts
Attorney, Agent, or Firm—Antonelli, Terry, Stout & Kraus

[57] ABSTRACT

A transmission having an inner rotationally mounted shaft (42) with first and second parts (44 and 46) and an outer concentric rotationally mounted shaft (49) in accordance with the invention includes a clutch (48) connected to the first and second parts of the inner shaft, which is movable between a first engaged position in which torque may be transmitted through the clutch between the first and second parts and a second position in which torque is not transmitted through the clutch; a transmission, coupling one of the parts of the inner shaft to the outer shaft to transmit torque from the inner shaft to the outer shaft when the inner shaft is rotating; an axially movable mechanism (61-80) disposed outside of and concentric with the outer shaft and projecting through the outer shaft for engaging one of the parts of the inner shaft to move the one part between first and second positions, the axially movable mechanism being movable between first and second positions to cause the one of the parts of the inner shaft to move axially between the first and second positions to move the clutch respectively between the first and second positions to control the transmission of torque between the parts of the inner shaft.

26 Claims, 3 Drawing Sheets

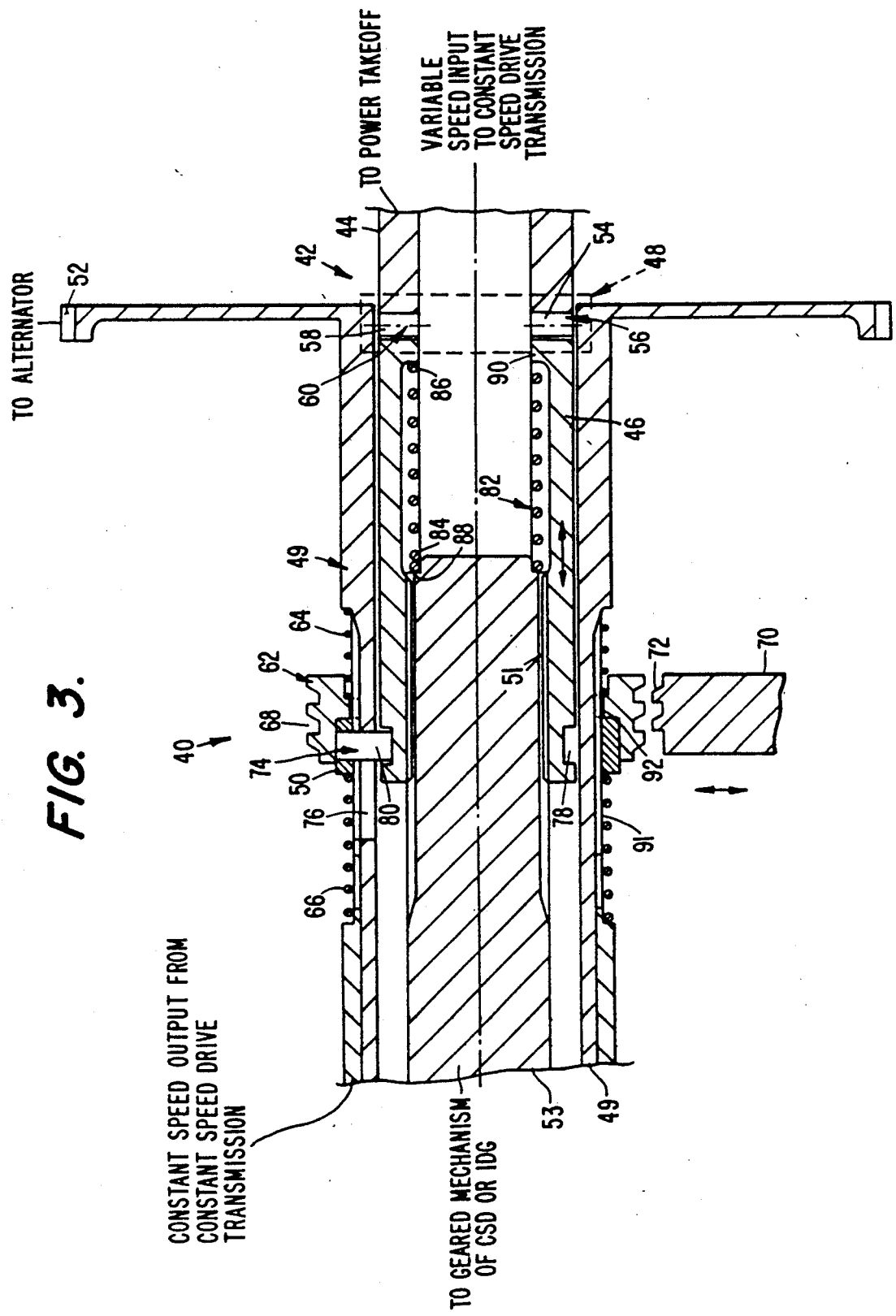

RESETTABLE SHAFT CLUTCH-DISCONNECT FOR A CO-AXIAL DRIVE SHAFT

TECHNICAL FIELD

The present invention relates to a power transmission having an inner shaft having first and second parts which are selectively connected together by a clutch and an outer concentric shaft in which torque is selectively transmitted from the inner shaft to the outer shaft. More specifically, the present invention relates to mechanisms for controlling the disconnection of the first and second parts of the inner shaft through control of the clutch engagement and disengagement.

BACKGROUND ART

A large variety of commercial airframes utilize a constant speed drive (CSD) and generator or an integrated drive generator (IDG) for generating three phase 400 Hz electrical power. The CSD and the CSD portion of the IDG function to convert a variable speed power takeoff from an aircraft propulsion engine gearbox into a constant shaft speed for driving a three phase alternator to produce three phase 400 Hz electrical power. Certain Boeing 747's, the McDonnell-Douglas DC-10 and many other aircraft utilize a CSD in which an outer drive shaft having first and second parts selectively couples a power takeoff from the aircraft engine outer gearbox when a clutch contained in the outer drive shaft is engaged. The clutch divides the outer drive shaft in to first and second parts. The outer concentric shaft is coupled by the internal CSD mechanism to the inner shaft which transmits torque from the output part of the inner drive shaft to drive the three phase alternator.

FIG. 1 illustrates a diagram of a prior art CSD disconnection mechanism which controls the engagement of a clutch coupling first and second parts of a drive shaft together. With respect to FIG. 1, a power takeoff from the aircraft engine is applied to a two part shaft 11 having a first part 12 which is coupled through a clutch 18 to a second part 14. The first part 12 and second part 14 is connected to the output 16 when the dog teeth of clutch 18 are engaged. Power from output 16 is applied to the carrier shaft of the CSD gear differential assembly (not illustrated). Inner shaft 17 applies power to a three phase alternator (not illustrated) mounted on an opposite side of a gearbox (not illustrated). A first segment 20 of clutch 18 is axially fixed in position The inner shaft 17 is driven at a constant velocity by the CSD gear differential assembly (not illustrated). A second segment 22 of the clutch 18 is axially movable between a first position, as illustrated, to a second position, as discussed below with reference to FIG. 2. A solenoid controlled plunger 24 causes an engagement of components which results in disengagement of the clutch 18 when released as illustrated in FIG. 2. Solenoid 26, as illustrated, holds the plunger 24 in a second extended position as illustrated in FIG. 1 by locking the moveable member in the second position against the force exerted by compressed spring 30. Upon application of a electric control signal through a control line (not illustrated) to solenoid 26, the member 28 of the solenoid withdraws into the solenoid to free plunger 24 to move from the second position to the first position as discussed below with reference to FIG. 2 under the force exerted by spring 30. A collar 32 having an outer threaded peripheral surface 33 rotates with the second part 14 of the shaft 12. End 34 of plunger 24 has threads which engage the threads of the peripheral surface 33 of collar 32.

FIG. 2 illustrates the disconnection mechanism of FIG. 1 after the plunger 24 has engaged the threaded collar 32 to cause the part 14 of the shaft and the part 22 of the clutch 18 to move axially to the left to disengage the clutch to decouple the second part 14 of the shaft 11 and output 16 from the first part 12. Like reference numerals identify like parts in FIGS. 1 and 2. After the clutch 18 is disengaged, the second part 14 of the shaft 11 and the output shaft 16 is reconnected to the first part 12 of the input shaft through the clutch 18 by pulling the plunger 24 downward to withdraw the threads of the end 34 of the plunger from contact with the threaded peripheral part of collar 32. Upon movement of the plunger 24 from the second position, as illustrated in FIG. 2 back to the first position, as illustrated in FIG. 1 spring 36 forces part 14 of the gearshaft assembly to the right to cause the first part 20 of the clutch 18 to engage the second part of the clutch 22 as illustrated in FIG. 1 to complete re-connection.

The aforementioned CSD in use in some models of Boeing 747's and on the McDonnell-Douglas DC-10 aircraft utilizes a disconnect mechanism similar to that described above with reference to FIGS. 1 and 2. This mechanism has the disadvantage that when CSD or IDG packaging and input shafting precludes the described designs when the previously described inner shaft 17 driving the alternator becomes the input shaft. In such cases it becomes necessary for the inner shaft of the two concentric shafts to include the disconnect. This has the disadvantage that it increases the overall axial length of the IDG with the concomitant weight penalty. Furthermore, overhung moment applied to the mounting flange of the casing of the CSD or IDG is significant enough to require increased cross-section for reinforcing of the flange which also results in a weight penalty. The overhung moment is a result of the mass of the CSD or IDG being supported by a mounting flange and the center of gravity of the mass being displaced away from the mounting flange.

U.S. Pat. No. 4,042,088, which is assigned to the assignee of the present invention, discloses a disconnect mechanism for use in a constant speed drive transmission.

U.S. Pat. No. 4,684,000, which is assigned to the assignee of the present invention, discloses a power transmission disconnect device with an operational interlock. Decoupling of an output shaft from an input shaft is accomplished by axial displacement of a clutch member. Displacement of the clutch from an engaged to a disengaged position is controlled by activation of an electric motor which drives a worm gear coupled to a throw out yoke for controlling the movement of the clutch from engaged to disengaged positions.

U.S. Pat. Nos. 2,642,970, 3,265,174, 3,713,518, 4,269,293, 4,393,965, and 4,562,908 disclose various forms of coupling mechanisms for controlling the application of rotary power.

DISCLOSURE OF INVENTION

The present invention provides an improved transmission of the type useful in CSD and IDG units used for the generation of electrical power in airframes. The invention permits the selective connection and disconnection of a clutch integral with an inner drive shaft having first and second parts which is concentric with an outer rotationally mounted shaft. The first and second parts are selectively coupled together by the clutch. A clutch engagement control mechanism extends through the outer drive shaft to selectively move one of the parts of the inner drive shaft between first and second positions to control the movement of the clutch between first and second positions in which the first and second parts of the inner drive shaft are respectively engaged and disengaged. The direct access to one of the parts of the inner drive shaft through the outer drive shaft permits the length of the casing housing the transmission to be reduced with a concomitant weight reduction. Furthermore, the necessity of requiring reinforcement of the flange to compensate for overhang moment is eliminated which further results in a weight reduction. The reduction of the overall length and weight of CSD and IDG units in airframe power generation systems is of significant importance to the overall weight, size and subsequent efficiency of the operation of the airframe.

A transmission having an inner rotationally mounted shaft with first and second parts and an outer concentric rotationally mounted shaft in accordance with the invention includes a clutch, connected to the first and second parts of the inner shaft, which is movable between a first engaged position in which torque may be transmitted through the clutch between the first and second parts and a second position in which torque is not transmitted through the clutch; a transmission, coupling one of the parts of the inner shaft to the outer shaft to control transmission of torque from the inner shaft to the outer shaft; an axially moveable mechanism disposed outside of and concentric with the outer shaft and projecting through the outer shaft for engaging one of the parts of the inner shaft to move the one part between first and second positions, the axially moveable mechanism being moveable between first and second positions to cause the one of the parts of the inner shaft to move axially between the first and second positions to move the clutch respectively between the first and second positions to control the transmission of torque between the inner shaft and the outer shaft. The first part of the inner shaft is coupled to an airframe propulsion engine; the second part of the inner shaft is coupled to a variable speed input of a constant speed drive; and the outer concentric shaft drives an alternating current generator. A transmission in accordance with the invention further includes an annular cutout within an outside circumference of the inner shaft; an axial slot extending through the outer shaft; and wherein the axially moveable mechanism comprises a radially projecting pin disposed within the cut-out and projecting radially outward through and radially outward from the slot; and a collar which is concentric with the outer shaft and which is movable between the first and second positions, the collar engaging a pin retainer so that movement of the collar between the first and second positions causes the pin to move axially within the slot to move the one part between the first and second positions. The invention further includes a mechanism for causing the collar to move from the first position to the second position and a mechanism for causing the collar to move from the second position to the first position and for biasing the collar in the first position; and a mechanism for causing the one part of the inner shaft to move from the second position to the first position and for biasing the one part of the shaft in the first position. The mechanism for causing the collar to move from the first position to the second position comprises threads disposed on an outside circumference of the collar, the threads rotating in response to rotation of the outer shaft; a plunger which is movable between first and second positions with the plunger engaging the threads of the collar, the plunger in the first position engaging the threads to cause the collar to move to the second position when the collar is rotating and the plunger in the second position not engaging the threads; and wherein the mechanism for causing the collar to move from the second position to the first position causes the collar to move from the second position to the first position as soon as the plunger disengages from the threads. The mechanism for causing the collar to move from the second position to the first position and for biasing the collar in the first position comprises first and second springs with the springs applying force to opposed portions of the collar with the springs establishing the first position of the collar and one of the springs causing the collar to move from the second position to the first position; and the mechanism for causing the one part of the inner shaft to move from the second position to the first position and biasing the one part of the shaft in the first position comprises a spring with the spring biasing the one part in the first position and opposing movement of the one part to the second position. Preferably, the clutch is a jaw clutch.

BRIEF DESCRIPTION OF THE DRAWINGS

FIG. 3 illustrates an embodiment of the present invention.

BEST MODE FOR CARRYING OUT THE INVENTION

Figure 1:
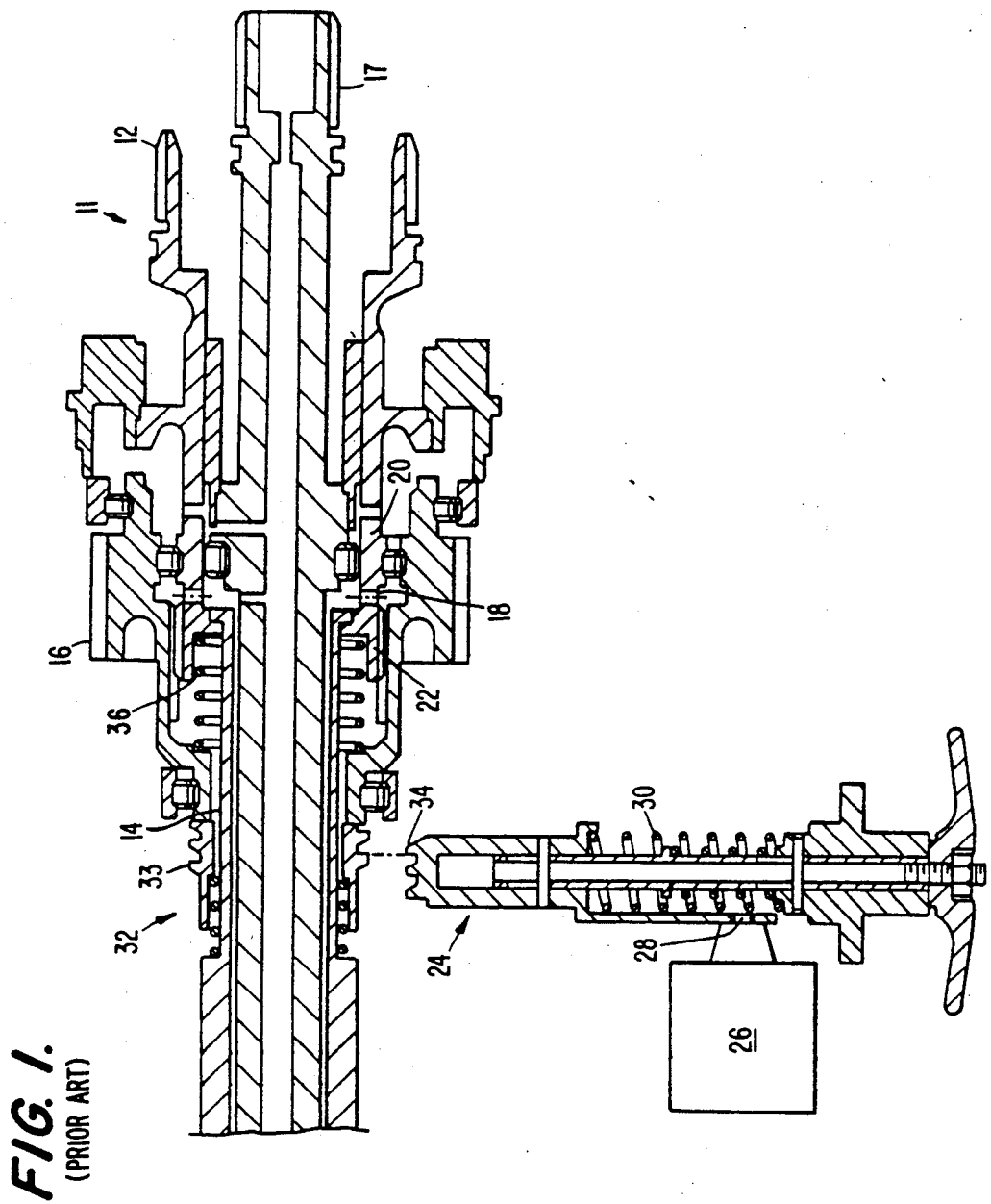
FIG. 1 illustrates a prior art disengagement mechanism for an IDG or CSD with the first and second parts of a drive shaft being connected together by a clutch in an engaged position.
Figure 2:
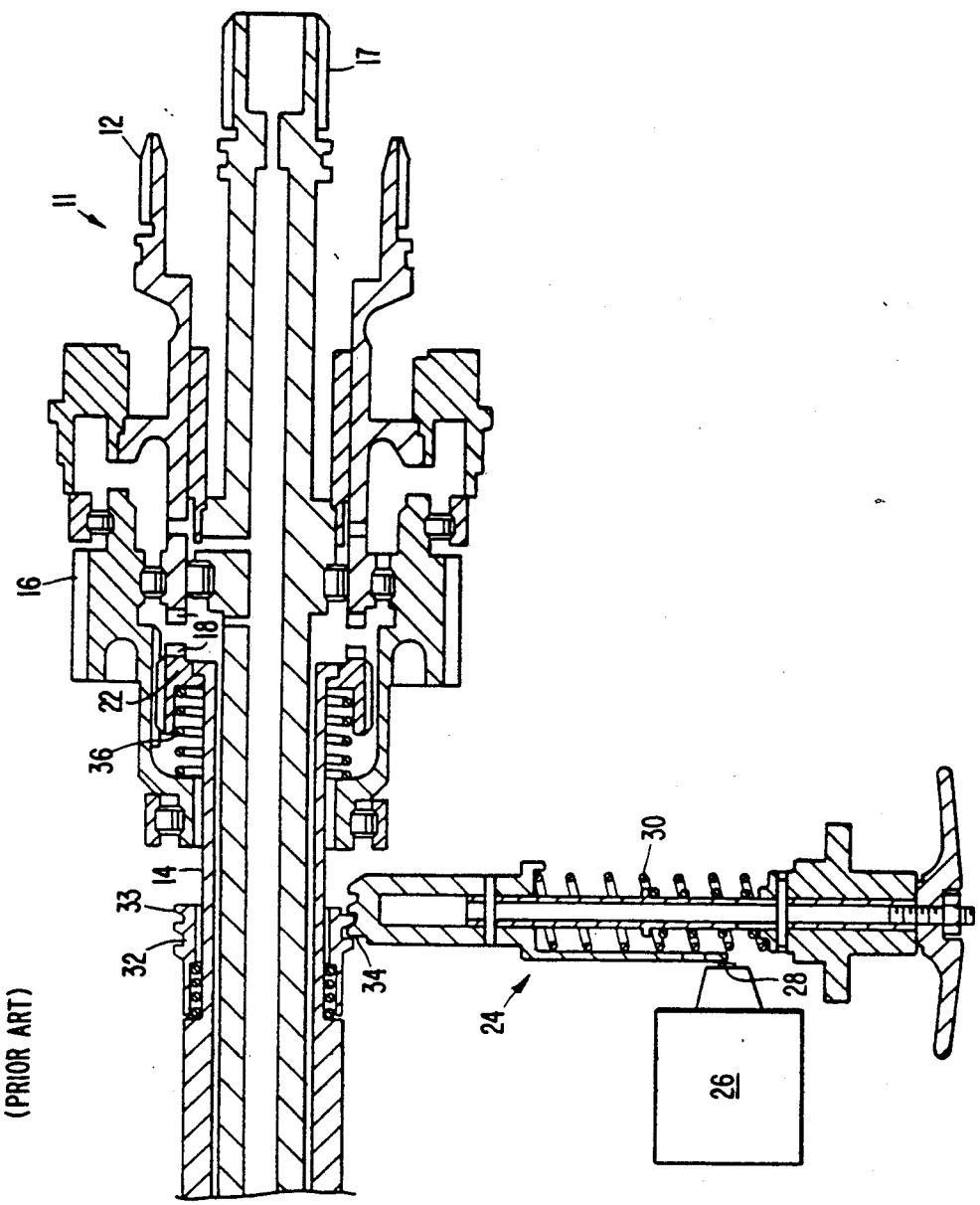
FIG. 2 illustrates the prior art system of FIG. 1 with the first and second parts of the drive shaft being disengaged by the clutch.

FIG. 3 illustrates a schematic of an embodiment 40 of the present invention for use in a CSD or IDG in an airframe electrical power generating system. The embodiment 40 functions to permit the selective decoupling of an inner shaft 42 having a first input part 44, which is connected to a power takeoff from a source of rotary motion, from a second output part 46 which drives a conventional internal CSD or IDG differential mechanism of a conventional constant speed drive transmission (not illustrated). The clutch 48 has a first position as illustrated having the first input part 44 connected to the second output part 46 and a second position (not illustrated) having the first part 44 decoupled from the second part 46. In the second position the second part 46 is axially translated to the left to disengage the teeth 54 and 58 of the clutch 48. A splined joint 51 on an internal surface of the second output part 46 drives shaft 53 which is a variable speed input to the differential of the aforementioned constant speed drive transmission which is not part of the present invention and which has been omitted to simplify the illustration of the invention. An outer coaxial gearshaft 49 is driven from the internal CSD or IDG gear differential mechanism of the aforementioned constant speed drive transmission at constant rotational velocity The outer coaxial shaft 49 supplies output torque to a load (not illustrated) through gear 52 which is integral with shaft 49 or is attached thereto In a preferred embodiment of the invention the load is a three phase alternator of an airframe electrical power generating system As stated above decoupling of the first input part 44 from the second output part 46 is accomplished by axially moving the second output part 46 to the left to disengage the jaw teeth 54 of the first part 56 of clutch 48 from the jaw teeth 58 of the second part 60 of the clutch. An annular collar 62, which is movable between first and second positions, functions to cause movement of the second output part 46 of the shaft 42 between first and second positions which causes the second part 60 of the clutch 48 to move between first and second positions. The annular collar 62 is biased into the first position as illustrated by coil spring 64. A pin retainer 50 is biased into the position as illustrated by coil spring 66. The coil spring 66 is compressed by movement of the annular collar 62 to the left. The outer coaxial shaft 49 has an external spline 91 and the collar has an internal spline 92. These splines are engaged to transmit rotation from the outer coaxial shaft 49 to the annular collar 62. The outer circumference annular collar 62 has threads 68. A plunger 70 is movable between a second position as illustrated to a first position to cause threads 72 on a surface of the plunger facing the threads 68 of the collar 62 to engage. The plunger may be in accordance with the prior art of FIGS. 1 and 2. Engagement of the threads 68 and 72 during rotation of the outer coaxial shaft 49 when rotary power is applied from the power takeoff to the first portion 44 of the shaft 42 causes the collar 62 to move to the left to compress spring 66 and to cause pin 74 to be axially moved within slot 76 which extends through the wall of the outer coaxial shaft 49. The second output portion 46 of the inner shaft 42 has an annular recess 78 which receives end 80 of pin 74. The pin retainer 50 fixes the pin 74 relative to the annular recess 78 and the slot 76. As a consequence of the relatively small clearance between the outer circumference of the end 80 of the pin 74 and the axial width of the annular recess 78, movement of the annular collar 62 to the left carries the second output part 46 of the inner shaft 42 to the left to cause the jaw teeth 54 to disengage from the jaw teeth 58 to decouple the first input part 44 of the shaft from the second output part. Compressed coil spring 82 biases the second part 46 of the inner shaft 42 into the first position by applying a force to the right. Ends 84 and 86 of spring 82, which respectively ride on outer shoulder 88 and on an inner shoulder 90 of the second part of the inner shaft apply force to the fixed shaft 53 second output part 46. When the movable plunger 70 moves from the first engaged position (not illustrated), which causes the collar 62 to translate to the left, to the second disengaged position as illustrated, the compressed spring 82 forces the second output part 46 of the inner shaft assembly 42 to the right to cause engagement of the jaw teeth 54 and 58 respectively of the first part 56 and the second part 60 of the clutch 48 and the compressed spring 66 simultaneously causes the collar 62 to move to the right to the position as illustrated in FIG. 3.

The present invention is further useful in applications requiring a reduction in axial length of a transmission in which an inner shaft having two parts is selectively decoupled from an input power source with one of the parts of the inner shaft driving a coaxial outer shaft. However, it should be further understood that the present invention may also be used in applications where the inner shaft is not connected to the outer shaft by a transmission with the outer shaft being rotationally mounted with respect to the inner shaft. It should be understood that the embodiment of FIG. 3 may be modified to include different configurations of the mechanism for translating the annular collar 62 with the plunger 70 movable between first and second positions being a preferred way of accomplishing translation of the movable collar between the first and second positions.

While the invention has been described in terms of its preferred embodiments, it should be understood that numerous modifications may be made thereto without departing from the spirit and scope of the invention. It is intended that all such modifications fall within the scope of the appended claims.

We claim:

1. A transmission having an inner rotationally mounted shaft with first and second parts and an outer concentric rotationally mounted shaft comprising:
    a clutch, connected to the first and second parts of the inner shaft, which is movable between a first engaged position in which torque may be transmitted through the clutch between the first and second parts and a second position in which torque is not transmitted through the clutch;
    means, coupling one of the parts of the inner shaft to the outer shaft to transmit torque from the one of the parts of the inner shaft to the outer shaft when the one part is rotating; and
    an axially movable mechanism disposed outside of and concentric with the outer shaft and projecting through the outer shaft for engaging one of the parts of the inner shaft to move the one part between first and second positions, the axially movable mechanism being movable between first and second positions to cause the one of the parts of the inner shaft to move axially between the first and second positions to move the clutch respectively between the first and second positions to control the transmission of torque between the parts of the inner shaft and between the inner shaft and the outer shaft.

2. A transmission in accordance with claim 1 wherein:
    the first part of the inner shaft is coupled to a constant speed drive transmission;
    the second part of the inner shaft is coupled to an airframe propulsion engine; and
    the outer concentric shaft drives an alternating current generator.

3. A transmission in accordance with claim 1 further comprising:
    an annular cut-out within an outside circumference of the inner shaft;
    an axial slot extending through the outer shaft and wherein the axially moveable mechanism comprises
    a radially projecting pin disposed within the cut-out and projecting radially outward through and radially outward from the slot; and
    a collar which is concentric with the outer shaft and which is movable between the first and second positions, the collar engaging the pin so that movement of the collar between the first and second positions causes the pin to move axially within the slot to move the one part between the first and second positions 4. A transmission in accordance with claim 3 further comprising:
   means for causing the collar and pin to move from the first position to the second position;
   means for causing the collar and pin to move from the second position to the first position and for biasing the collar and pin in the first position; and
   means for causing the one part of the inner shaft to move from the second position to the first position and for biasing the one part of the shaft in the first position.

5. A transmission in accordance with claim 4 wherein the means for causing the collar and pin to move from the first position to the second position comprises:
   threads disposed on an outside circumference of the collar, the collar in response to rotation of the outer shaft;
   a plunger which is movable between first and second positions with the plunger engaging the threads of the collar, the plunger in the first position engaging the threads to cause the collar to move to the second position when the collar is rotating and the plunger in the second position not engaging the threads; and wherein
   the means for causing the collar and pin to move from the second position to the first position and for biasing the collar and pin in the first position causes the collar and pin to move from the second position to the first position as soon as the plunger disengages from the collar.

6. A transmission in accordance with claim 5 wherein:
   the means for causing the collar and pin to move from the second position to the first position and for biasing the collar and pin in the first position comprises first and second springs with the springs applying force to opposed portions of the collar and a pin retainer with the springs in an uncompressed state establishing the first position of the collar and pin and one of the springs in a compressed state causing the collar and the pin retainer to move from the second position to the first position; and
   the means for causing the one part of the inner shaft to move from the second position to the first position and biasing the one part of the shaft in the first position comprises a spring with the spring biasing the one part in the first position and opposing movement of the one part to the second position.

7. A transmission in accordance with claim 2 further comprising:
   an annular cut-out within an outside circumference of the inner shaft;
   an axial slot extending through the outer shaft and wherein the axially moveable mechanism comprises;
   a radially projecting pin disposed within the cut-out and projecting radially outward through and radially outward from the slot; and
   a collar, and pin retainer which are concentric with the outer shaft and which are movable between the first and second positions, the collar engaging the pin retainer and pin so that movement of the collar between the first and second positions causes the pin and pin retainer to move axially within the slot to move the one part between the first and second positions.

8. A transmission in accordance with claim 7 further comprising:
   means for causing the collar, pin retainer and pin to move from the first position to the second position;
   means for causing the collar, pin retainer and pin to move from the second position to the first position and for biasing the collar, pin and pin retainer in the first position; and
   means for causing the one part of the inner shaft to move from the second position to the first position and for biasing the one part of the shaft in the first position.

9. A transmission in accordance with claim 8 wherein the means for causing the collar, pin retainer and pin to move from the first position to the second position comprises:
   threads disposed on an outside circumference of the collar, the collar in response to rotation of the outer shaft;
   a plunger which is movable between first and second positions with the plunger engaging the threads to cause the collar, pin retainer and pin to move to the second position when the collar is rotating and the plunger in the second position not engaging the threads; and wherein
   the means for causing the collar, pin retainer and pin to move from the second position to the first position causes the collar, pin retainer and pin to move from the second position to the first position as soon as the plunger disengages from the collar.

10. A transmission in accordance with claim 9 wherein:
    the means for causing the collar, pin retainer and pin to move from the second position to the first position and for biasing the collar, pin retainer and pin in the first position comprises first and second springs with the springs engaging opposed portions of the collar, and pin retainer with the springs establishing the first position of the collar, pin and pin retainer and one of the springs causing the collar, pin and pin retainer to move from the second position to the first position; and
    the means for causing the one part of the inner shaft to move from the second position to the first position and biasing the one part of the shaft in the first position comprises a spring with the spring biasing the one part in the first position and opposing movement of the one part to the second position.

11. A transmission in accordance with claim 3 wherein the output shaft comprises:
    a splined joint disposed between an outer circumference of the output shaft and an inner part of the second part of the inner shaft.

12. A transmission in accordance with claim 1 wherein the axially movable mechanism comprises:
    a collar, a pin retainer and pin disposed between an inner circumference of the collar and an outer circumference of the output shaft; and
    wherein the pin is positioned by the pin retainer to provide engagement with an annular cutout in the second part.

13. A transmission in accordance with claim 1 wherein the means coupling one of the parts of the inner shaft to the outer shaft comprises:
    a constant speed drive transmission receiving torque transmitted by the second part and driving the outer shaft at a constant velocity.

14. A transmission in accordance with claim 3 wherein the means coupling one of the parts of the inner shaft to the outer shaft comprises:
- a constant speed drive transmission receiving torque transmitted by the second part and driving the outer shaft at a constant velocity.

15. A transmission in accordance with claim 4 wherein the means coupling one of the parts of the inner shaft to the outer shaft comprises:
- a constant speed drive transmission receiving torque transmitted by the second part and driving the outer shaft at a constant velocity.

16. A transmission in accordance with claim 5 wherein the means coupling one of the parts of the inner shaft to the outer shaft comprises:
- a constant speed drive transmission receiving torque transmitted by the second part and driving the outer shaft at a constant velocity.

17. A transmission in accordance with claim 6 wherein the means coupling one of the parts of the inner shaft to the outer shaft comprises:
- a constant speed drive transmission receiving torque transmitted by the second part and driving the outer shaft at a constant velocity.

18. A transmission in accordance with claim 7 wherein the means coupling one of the parts of the inner shaft to the outer shaft comprises:
- a constant speed drive transmission receiving torque transmitted by the second part and driving the outer shaft at a constant velocity.

19. A transmission in accordance with claim 1 wherein:
- the second part of the inner shaft does not overlap the first part of the inner shaft with respect to an axis of rotation.

20. A transmission in accordance with claim 19 wherein:
- the first part of the inner shaft is coupled to a constant speed drive transmission;
- the second part of the inner shaft is coupled to an airframe propulsion engine; and
- the outer concentric shaft drives an alternating current generator.

21. A transmission in accordance with claim 20 further comprising:
- an annular cut-out within an outside circumference of the inner shaft;
- an axial slot extended through the outer shaft and wherein the axially moveable mechanism comprises;
- a radially projecting pin disposed within the cutout and projecting radially outward through and radially outward from the slot; and
- a collar, and pin retainer which are concentric with the outer shaft and which are movable between the first and second positions, the collar engaging the pin retainer and pin so that movement of the collar between the first and second positions causes the pin and pin retainer to move axially within the slot to move the one part between the first and second positions.

22. A transmission in accordance with claim 21 further comprising:
- means for causing the collar, pin retainer and pin to move from the first position to the second position;
- means for causing the collar, pin retainer and pin to move from the second position to the first position and for biasing the collar, pin and pin retainer in the first position; and
- means for causing the one part of the inner shaft to move from the second position to the first position and for biasing the one part of the shaft in the first position.

23. A transmission in accordance with claim 17 wherein the axially movable mechanism comprises:
- a collar, a pin retainer and pin disposed between an inner circumference of the collar and an outer circumference of the output shaft; and
- wherein the pin is positioned by the pin retainer to provide engagement with an annular cutout in the second part.

24. A transmission in accordance with claim 21 wherein the means coupling one of the parts of the inner shaft to the outer shaft comprises:
- a constant speed drive transmission receiving torque transmitted by the second part and driving the outer shaft at a constant velocity.

25. A transmission having an inner rotationally mounted shaft with first and second parts and an outer concentric rotationally mounted shaft comprising:
- a clutch, connected to the first and second parts of the inner shaft, which is movable between a first engaged position in which torque may be transmitted through the clutch between the first and second parts and a second position in which torque is not transmitted through the clutch; and
- an axially movable mechanism disposed outside of and concentric with the outer shaft and projecting through the outer shaft for engaging one of the parts of the inner shaft to move the one part between first and second positions, the axially movable mechanism being movable between first and second positions to cause the one of the parts of the inner shaft to move axially between the first and second positions to move the clutch respectively between the first and second positions to control the transmission of torque between the parts of the inner shaft.

26. A transmission in accordance with claim 25 further comprising:
- an annular cut-out within an outside circumference of the inner shaft; and
- wherein the axially moveable mechanism includes an axial slot extending through the outer shaft;
- a radially projecting pin disposed within the cut-out and projecting radially outward through and radially outward from the slot; and
- a collar which is concentric with the outer shaft and which is movable between the first and second positions, the collar applying force to the pin so that movement of the collar between the first and second positions causes the pin to move axially within the slot to move the one part between the first and second positions.

* * * * *